Inventors
Cecil C. Stone
Robert H. Olp
George J. Pokorny

Attorney

United States Patent Office 3,376,470
Patented Apr. 2, 1968

3,376,470
CAPACITOR DISCHARGE CIRCUIT FOR STARTING
AND SUSTAINING A WELDING ARC
Cecil C. Stone and Robert H. Olp, Downers Grove, and George J. Pokorny, Glen Ellyn, Ill., assignors to the United States of America as represented by the United States Atomic Energy Commission
Filed Aug. 12, 1965, Ser. No. 479,355
3 Claims. (Cl. 315—171)

ABSTRACT OF THE DISCLOSURE

A direct current arc starter for use with a welding current source includes a high-voltage, low-charge capacitor charged to a voltage sufficient to establish an arc and a low-voltage, high-charge capacitor charged to a voltage sufficient to sustain a stable arc. The capacitors are connected in parallel and a diode isolates the lower voltage capacitor from the high voltage capacitor. The combined circuit is connected in series with an inductor to the welding electrodes.

This invention relates to arc welding in an inert gas atmosphere, and more particularly to apparatus for starting and sustaining a direct current welding arc until the welding current source can supply the welding current.

Arc starters for welding current sources may be classified into two broad categories: AC starters and DC starters. The DC type of arc starters offer certain advantages over the AC type, namely, stability of an established arc and no loss of power in feed lines when the welding electrodes are remote from the arc current source. However, DC arc starters are relatively expensive since they must have sufficient open-circuit voltage to start the arc and must also be capable of supplying sufficient current to sustain a stable arc before the welding current source can supply the welding current. This usually imposes severe power requirements on the arc starter resulting in the use of costly components. The present invention reduces the power requirements for a DC arc starter while at the same time maintaining all of its advantages.

The main object, therefore, of the present invention is to provide inexpensive and reliable apparatus for starting and establishing a DC welding arc until the welding current source can supply the welding current.

Briefly, this is accomplished by charging a high-voltage, low-charge capacitor to a voltage sufficient to start an arc, and by charging a low-voltage, high-charge capacitor with sufficient charge to sustain a stable arc. The two capacitors are connected in parallel with a diode isolating the lower voltage from the higher and this circuit is connected in series with an inductor to the welding electrodes. The high voltage on the first capacitor starts the arc and this capacitor discharges through the inductor thereby lowering the voltage across the electrodes and forward-biasing the isolating diode. Both capacitors then discharge in parallel through the inductor and the arc to sustain a stable arc. The inductor serves to maintain the arc current during the period when the isolating diode is beginning to conduct and until the second and larger capacitor can discharge through the started arc.

The nature and further objects of the invention can be better understood from the following description and attached drawings which illustrate, by way of example, a preferred embodiment of the invention.

Figure 1:
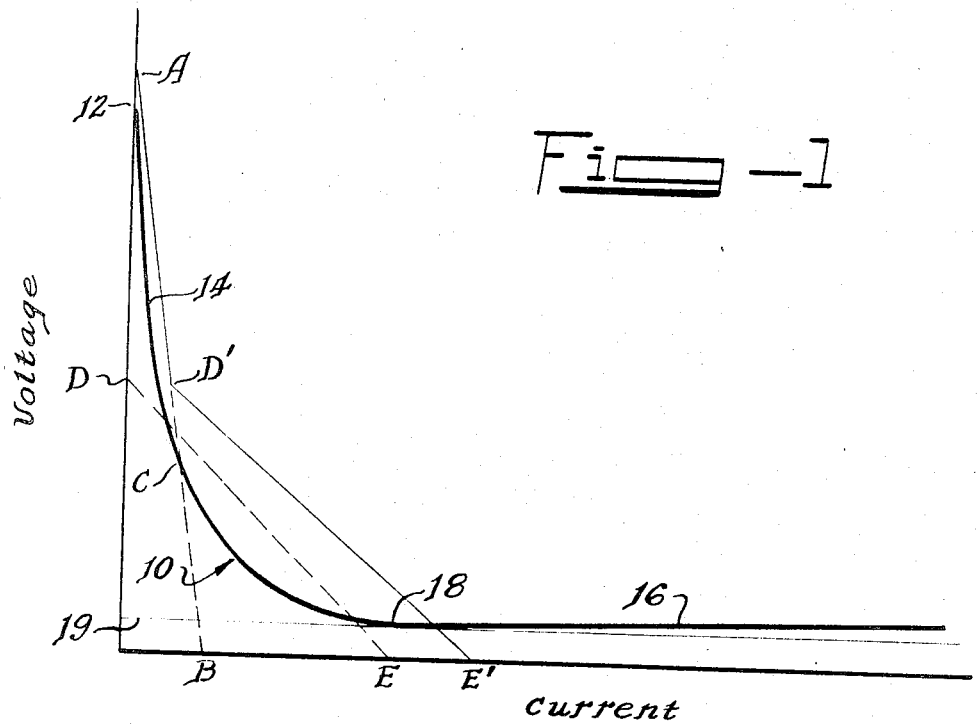
FIG. 1 is a plot of the voltage-current characteristics of a typical inert gas used in welding.

Referring to FIG. 1, the curve 10 represents the voltage-current (or V-I) characteristic curve (hereinafter called the load curve) of a typical inert gas that may be used in welding. The load curve 10 does not represent any one particular inert welding gas, but rather indicates the general nature of most welding gases as it relates to their arcing characteristics. The main features of load curve 10 with respect to the present invention are:

(1) The relatively high voltage required to start an arc, indicated by reference numeral 12;

(2) The steep negative-resistance portion of the characteristic, indicated by reference numeral 14; and (3) The low positive-resistance region indicated by reference numeral 16.

Using well-known techniques of load-line circuit analysis, the principle of the present invention may be explained as follows: an arc is said to be "started" when superposition of the mirror image (taken about the VOLTAGE axis) of the output impedance V-I characteristic curve of the source (hereinafter called the source curve) on the load curve 10 indicates that the voltage across the gap, that is the applied voltage, is greater than the minimum voltage required to start an arc, as indicated by reference numeral 12. However, even though an arc is started, it is not stable (i.e., will be extinguished) unless the source curve crosses the load curve 10 in a positive-resistance region. In other words, after an arc is started, it will not be sustained unless the power source supplies a current to the load greater than that indicated by reference numeral 18, which marks the beginning of the low positive-resistance region. The power requirements of such an arc starter are quite severe.

In summary, an arc starter for a welding current supply must, first of all, be capable of generating sufficient voltage to break down the arc (that is, have an open-circuit voltage greater than the voltage indicated by reference numeral 12 on curve 10); and secondly, be capable of supplying sufficient current to sustain a stable arc (that is, have a short-circuit current greater than the current indicated by reference numeral 18 of curve 10).

The present invention reduces the stress on the individual components of an arc starter by separating the functional requirements in what might be considered as separate power supplies, and combining the operation of these power supplies to act coordinatingly in starting and sustaining a stable arc. Still referring to FIG. 1, it can be seen that a power supply having a source curve as indicated by the partially-dashed line A-B will start an arc since it is capable of supplying an open-circuit voltage greater than that indicated by reference numeral 12. This power supply will not, however, be able to sustain an arc since the source curve (A-B) crosses the load curve 10 in the negative-resistance portion of the load curve 10, indicated by reference letter C. This represents an unstable region of the load curve 10 and consequently the arc will be extinguished. If such a power supply were applied to welding electrodes, an arc would be started and extinguished periodically. Therefore, a second power supply is used in parallel with the first supply. The source curve of the second supply is represented by the dashed line D-E of FIG. 1. It will be noted from the characteristics of its source curve D-E, that this second supply is capable of supplying a greater short-circuit current than the first supply but not as large an open-circuit voltage. If both supplies are connected in parallel and separated by an isolating diode such that the higher voltage supply does not discharge through the lower voltage supply, the combined source curve for both supplies is obtained by adding the currents of the individual supplies at constant values of voltage, as is well-known in the technique of load-line analysis. Therefore, the resultant source curve of the combined supplies is indicated by the solid curve A-D'-E' of FIG. 1.

It will be further noted from FIG. 1, that a power supply represented by the combined source curve A-D'-E' is capable of supplying a sufficient open-circuit voltage to start the arc and also of supplying sufficient short-circuit current to sustain the arc once it is started and the voltage across the arc has reduced to a value less than the voltage represented by the reference letter D.

Figure 2:
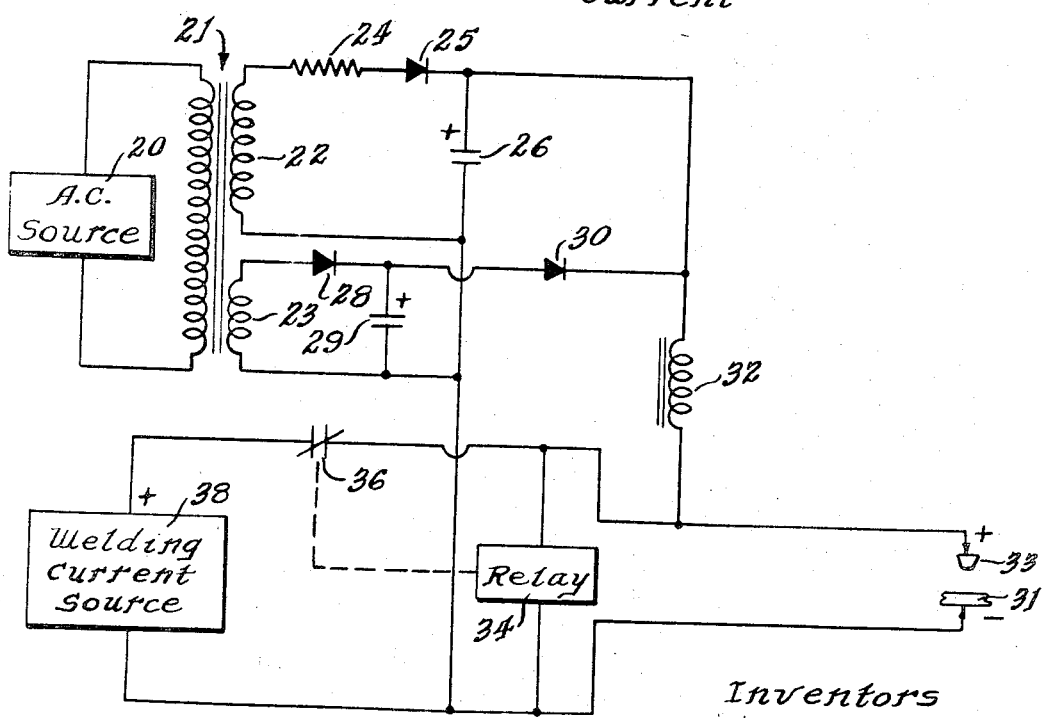
FIG. 2 is a diagrammatic circuit drawing of a preferred embodiment of the invention.

As shown in FIG. 2, a source 20 of single-phase alternating current is connected to the primary winding of a transformer 21 having two secondary windings 22 and 23. Secondary winding 22 develops a substantially higher voltage than secondary winding 23. Secondary winding 22 has a series circuit connected across its terminals consisting of a resistor 24, a rectifying diode 25, and a capacitor 26. The DC voltage building up on capacitor 26 has a positive polarity at the terminal connected to the cathode of the rectifying diode 25. The secondary winding 23 has a series circuit connected across its terminals consisting of a rectifying diode 28 and a capacitor 29. An isolating diode 30 is connected between the positive terminals of capacitors 26 and 29, with its anode connected to the positive terminal of capacitor 29. The negative terminals of capacitors 26 and 29 are connected in common and also connected to a negative welding electrode 31. An inductor 32 has one of its terminals connected to the common junction of the capacitor 26 and diode 30 and its other terminal connected to a positive welding electrode 33.

A voltage-sensitive relay 34 is connected across the welding electrodes and has a normally closed contact 36, which is connected in series between the positive terminal of a source 38 of DC welding current and the positive welding electrode 33 such that only the current from source 38 flows through the contacts 36. The negative welding electrode 31 is connected to the negative terminal of the source 38.

The circuit of FIG. 2 operates as follows: the secondary winding 22 of transformer 21 supplies a single-phase, half-wave-rectified voltage to capacitor 26. The rectification is accomplished by diode 25. The secondary winding 22 is designed so that the voltage build up on capacitor 26 will be sufficient to generate an arc across the welding electrodes 31 and 33 and substantially higher than the voltage built up on capacitor 29. This requires a relatively high voltage rating for the capacitor 26, but the capacitor 26 has a substantially lower capacitance than capacitor 29 because its only requirement is to start the arc, whereas capacitor 29 must store enough charge to sustain a stable arc.

The secondary winding 23 of transformer 21 supplies a single-phase voltage which is rectified by diode 28 to capacitor 29. The two capacitors 26 and 29 are connected capacitor 29. The higher voltage of capacitor 26 is isolated from the lower voltage of capacitor 29 by isolating diode 30. The combination of the capacitors 26 and 29 and isolating diode 30 is connected in series with inductor 32 and the entire circuit is connected across the welding electrodes 31 and 33 so that the capacitors 26 and 29 are allowed to discharge in parallel through the inductor 32 and across the electrodes 31 and 33. In operation, the higher voltage on capacitor 26 will start the arc, and capacitor 26 will discharge through the inductor 32 and the started arc until the electrode voltage is low enough to forward-bias isolating diode 30 thereby discharging capacitor 26 and capacitor 29 in parallel through inductor 32 and the started arc. Resistor 24 acts to limit the current from the secondary transformer winding 22, which develops a substantially higher voltage than secondary winding 23.

When the voltage across the arc falls to a minimum value, as indicated by reference numeral 19 of FIG. 1, the voltage-sensitive relay 34 de-energizes, thereby closing the normally closed contact 36 and conductively coupling the welding current source 38 to the welding electrodes 31 and 33.

The inductor 32 serves an important function in the operation of starting and sustaining an arc in that it maintains a constant arc current during the time when isolating diode 30 is becoming forward-biased so that the charge on capacitor 29 may discharge through the arc. In other words, inductor 32 maintains the arc current until the larger capacitor 29 is capable of discharging through the arc to sustain a stable arc.

It has been found helpful, but not necessary, to include a second resistor between the positive terminal of capacitor 26 and the common junction of diode 30 and inductor 32. This resistor (not shown) helps to lengthen the discharge time constant of the higher voltage supply (capacitor 26 and its associated charging circuitry) so that this time constant is comparable to the discharge time constant of the lower voltage supply (capacitor 29 and its associated charging circuitry).

It will be obvious to those skilled in the art that there are many equivalents capable of performing the same or similar functions as those in the preferred embodiment discussed. Consequently, it is to be understood that the applicants do not intend that their invention be limited to the specific example given, but intend that it cover all modifications and alternative constructions falling within the spirit and scope of the invention as expressed in the appended claims.

The embodiments of the invention in which an exclusive property or privilege is claimed are defined as follows:

1. A direct current arc starter for use with a welding current source adapted to supply welding current to welding electrodes after a stable arc is established across said electrodes comprising, in combination:
   (1) first and second capacitors, said first capacitor having a substantially higher voltage rating and substantially smaller capacitance than said second capacitor;
   (2) means for charging said first capacitor to a DC potential sufficient to start an arc across the welding electrodes;
   (3) means for charging said second capacitor to a DC potential substantially lower than the potential across said first capacitor, said second capacitor having sufficient capacitance and stored charge to sustain a stable arc across said welding electrodes;
   (4) means for connecting said first and second capacitors in parallel including means for preventing discharge of the higher voltage of said first capacitor through said second capacitor;
   (5) inductor means; and
   (6) means for connecting in series a first welding electrode, said inductor means, said parallel capacitors, and the second welding electrode;
whereby an arc is started across the electrodes discharging said first capacitor to the potential of said second capacitor and thereafter discharging said first and second capacitors in parallel thereby sustaining said arc until the welding current source conducts.

2. A direct current arc starter for use with a welding current source adapted to be conductively coupled to welding electrodes after a stable arc is established across said electrodes comprising, in combination:
   (1) first and second capacitors, said first capacitor having a substantially higher voltage rating and substantially smaller capacitance than said second capacitor;
   (2) means for charging said first capacitor to a DC potential sufficient to start an arc across the welding electrodes;
   (3) means for charging said second capacitor to a DC potential substantially lower than the potential across said first capacitor, said second capacitor having sufficient capacitance and stored charge to sustain a stable arc across said welding electrodes;
   (4) unidirectional current conducting means connected between terminals of like polarity of said first and second capacitors such that the higher potential of said first capacitor will not discharge through said second capacitor;

(5) inductor means connected between a first welding electrode and the common junction of said first capacitor and said unidirectional current conducting means;

(6) means for connecting in common the terminals of said first and second capacitors not connected to said unidirectional current conducting means and for connecting this common junction of said capacitors to the second welding electrode; whereby an arc is started across the electrodes discharging said first capacitor to a potential at which said unidirectional current conducting means begins to conduct, thereafter discharging both of said capacitors in parallel through said inductor and across said arc, and further lowering the voltage across said electrodes; and (7) means responsive to the voltage across said electrodes for conductively coupling the welding current source to said electrodes when a stable arc exists across said electrodes.

3. A direct current arc starter for use with a welding current source adapted to supply welding current to the welding electrodes after a stable arc is established across said electrodes comprising in combination:

(1) a source of single-phase, alternating current;
(2) a transformer having its primary terminals connected to said alternating current source and having first and secondary windings, said first and secondary winding having an open-circuit voltage substantially higher than the open-circuit voltage of said secondary winding;
(3) first and second rectifying diodes;
(4) current limiting means;
(5) a first capacitor connected in series circuit with said first rectifying diode and said current limiting means across said first secondary winding, whereby a half-wave rectified voltage stores a DC charge in said first capacitor at a voltage sufficient to start an arc across said welding electrodes;
(6) a second capacitor having substantially larger capacitance and substantially lower voltage rating than said first capacitor and connected in series circuit with said second rectifying diode across said second secondary winding, whereby a second DC charge is stored in said second capacitor sufficient to sustain a stable arc across the welding electrodes;
(7) a third diode;
(8) means for connecting said third diode between the positive terminals of said first and second capacitors such that said first capacitor will not discharge through said second capacitor;
(9) an inductor;
(10) means for connecting one terminal of said inductor to the common junction of said first capacitor and said third diode and for connecting the other terminal of said inductor to a first welding electrode; and
(11) means for connecting the negative terminals of said first and second capacitors to the second welding electrode;

whereby an arc is started across said electrodes thereby discharging said first capacitor through said inductor and said arc until the voltage across the electrodes is lowered to a voltage at which said third diode conducts, thereby sustaining said arc by discharging said first and second capacitors in parallel until the welding current source conducts.

References Cited
UNITED STATES PATENTS

| | | | |
|---|---|---|---|
| 2,235,385 | 3/1941 | Raua | 315—241 X |
| 2,834,917 | 5/1958 | Moignet | 315—173 X |
| 3,274,500 | 9/1966 | Bengston | 328—108 |
| 3,286,128 | 11/1966 | Ward | 315—241 |

JOHN W. HUCKERT, *Primary Examiner.*

R. F. POLISSACK, *Assistant Examiner.*